United States Patent [19]

Hanada et al.

[11] Patent Number: 4,925,731

[45] Date of Patent: May 15, 1990

[54] HEAT-SENSITIVE TRANSFER MATERIAL

[75] Inventors: Koji Hanada, Chmiyashi; Masashi Sawamura, Shiraokamati; Takeshi Yoshikawa, Katushikaku; Hiroyuki Nihashi, Yonoshi; Tsuneo Tanaka, Meguroku, all of Japan

[73] Assignee: Toyo Ink Manufacturing Co., Ltd., Tokyo, Japan

[21] Appl. No.: 305,608

[22] Filed: Feb. 2, 1989

Related U.S. Application Data

[62] Division of Ser. No. 170,308, Mar. 14, 1988, abandoned.

[30] Foreign Application Priority Data

Mar. 17, 1987 [JP] Japan .................................. 62-60215

[51] Int. Cl.[5] .............................................. B32B 9/04

[52] U.S. Cl. .................................... 428/336; 428/195; 428/212; 428/484; 428/488.1; 428/488.4; 428/913; 428/914

[58] Field of Search ...................... 428/195, 484, 488.1, 428/488.4, 913, 914, 336, 411.1, 212

[56] References Cited

U.S. PATENT DOCUMENTS

| | | | |
|---|---|---|---|
| 4,681,796 | 7/1987 | Maehashi et al. | 428/212 |
| 4,708,903 | 11/1987 | Tanaka et al. | 428/195 |
| 4,818,591 | 4/1989 | Kitamura et al. | 428/488.1 |

FOREIGN PATENT DOCUMENTS

| | | | |
|---|---|---|---|
| 1295089 | 12/1986 | Japan | 428/913 |

*Primary Examiner*—Pamela R. Schwartz
*Attorney, Agent, or Firm*—Wenderoth, Lind & Ponack

[57] ABSTRACT

This invention provides a heat-sensitive transfer layer which comprises a substrate and a heat-melting ink layer provided to one surface of said substrate, characterized by providing, between said substrate and heat-melting ink layer, an interlayer which breaks away within itself by separation under heat at the time of heat transfer.

8 Claims, 1 Drawing Sheet

HEAT-SENSITIVE TRANSFER MATERIAL

This application is a division of application Ser. No. 170,308, filed Mar. 14, 1988, abandoned in favor of a continutation application Ser. No. 319,869, filed Mar. 2, 1989.

FIELD OF THE INVENTION

This invention relates to a heat-sensitive transfer material for use in recording by heat-sensitive transfer, and particularly relates to a heat-sensitive transfer material giving mat printed characters.

DESCRIPTION OF PRIOR ART

The printing system by heat-sensitive transfer methods comprises providing one surface of a substrate with a heat-melting ink layer and heating said heat-melting layer from the opposite side of the substrate side, while said heatmelting layer and a receptor sheet are in contact, by the use of a heating means such as a thermal head to give the receptor sheet transferred image or characters according to information given to the heating means.

With regard to the substrate, conventionally, it is proposed to use papers such as a condenser paper, glassine paper, etc., and surface-smooth heat-resistant films such as polyester, polyimide, polycarbonate, polyamide, polypropylene, etc.

However, in the case of merely providing the surfaces of these substrates with a heat-melting ink layer and transferring the heat-melting ink layer according to the above system, the surface of the transferred ink layer is highly smooth and glossy due to separation in the boundary between each of the smooth substrates and the heat-melting ink.

Such glossy surfaces are appreciated in the case of full color printing owing to high color density. However, in printed matter requiring the readability of written information, glossy surfaces are, in general, not desired due to high strain of the eyes, etc., and matted printed matter is desired.

As means to give the matted printed matter, Japanese Laid-Open Patent Publication No. 101083/1985 proposes a method of providing the surface of a plastic base film with a mat layer obtained by dispersing an inorganic pigment in a resin such that the average depth of the formed concaves and convexes becomes 0.15 to 2 μm. Japanese Laid-Open Patent Publication No. 101084/1985 proposes a method of providing the surface of a base film with concaves and ccnvexes.

These methods attempt to transfer the surface configuration of a mat layer or base film onto transferred printed matter in order to obtain a mat effect as a result of separation in the boundary between a heat-melting ink layer and the mat layer or base film. However, said effect is insufficient and further, if a mat layer is provided onto a substrate, the substrate becomes thicker by the thickness of the mat layer, which gives rise to a decline in sensitivity. Moreover, in the case when the surface of a substrate is provided with concaves and convexes, there are defects that the control of concave and convex is difficult and leads to higher costs, etc.

SUMMARY OF THE INVENTION

The object of this invention is to provide a heat-sensitive transfer material suitable for use in printing charactered information requiring readability.

Another object of this invention is to provide a heat-sensitive transfer material capable of giving the matted-tone printed matter having reduced gloss on the surfaces of printed characters.

Still another object of this invention is to provide a heat-sensitive transfer material capable of making it possible to effect the matted-tone printing without causing a decline in sensitivity.

Yet another object of this invention is to provide a heat-sensitive transfer material capable of giving the clear matted-tone printed matter free from the controlling of concaves and convexes on the surface of a substrate or mat layer.

This invention provides a heat-sensitive transfer layer which comprises a substrate and a heat-melting ink layer provided to one surface of said substrate, characterized by providing, between said substrate and heat-melting ink layer, an interlayer which breaks away within itself by separation under heat at the time of heat transfer.

DETAILED DESCRIPTION OF THE INVENTION

The transfer material of this invention produces an effect of matting a transferred article by concaves and convexes of the broken away surface of a specific-compounds-containing interlayer which easily breaks awa at the time of transfer and separation of an ink layer.

Figure 1:
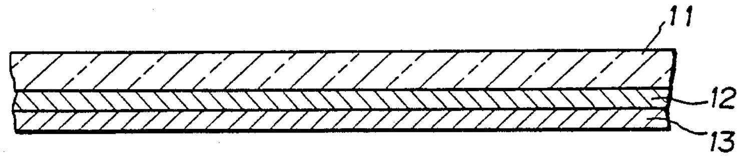
FIG. 1 shows a cross sectional view of the heat-sensitive transfer material of this invention.
Figure 2:
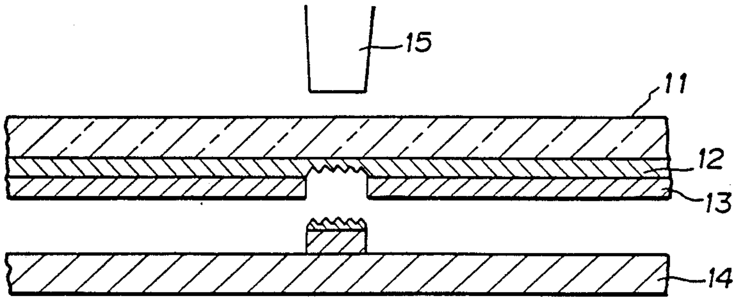
FIG. 2 shows a cross sectional view of the heat-sensitive transfer material of this invention, in which the interlayer has broken away within itself at the time of heat-transfer.

FIG. 1 shows the basic structure of a heat-sensitive transfer material comprising a substrate 11 and a heat-melting ink layer 13 which is provided to one surface of the substrate 11 through an interlayer 12. FIG. 2 is a cross sectional view showing a break-away state of the interlayer 12 at the time of bringing a receptor 14 and the heat-sensitive transfer material of this invention into contact, heating from the substrate 11 side by a thermal head 15 and then separating the receptor 14 and the heat-sensitive transfer material.

Examples of the compound contained in the interlayer of this invention include high fatty acid metal salts represented by formula $$(C_nH_{2n+1}COO)_mMe$$

wherein n denotes an integer of from 11 to 31, m denotes an integer of from 1 to 3 and Me denotes at least one metal selected from the group consisting of lithium, sodium, potassium, magnesium, calcium, barium, zinc and aluminum, or their derivatives such as metal salt of 12-hydroxystearic acid of formula $$[C_6H_{13}—CH(OH)—(CH_2)_{10}—COO]_mMe$$

wherein m and M the same meanings as in the above, or aliphatic acid amide of formula $$C_nH_{2n+1}NHCO(CH_2)_mCONHC_nH_{2n+1}$$

$$C_nH_{2n+1}CONH(CH_2)_mNHCOC_nH_{2n+1}$$

wherein n denotes an integer of from 12 to 32 and m denotes an integer of from 1 to 6, or its derivatives such as 12-hydroxystearic acid amide of formula $$C_6H_{13}-CH(OH)-(CH_2)_{10}-CONH(CH_2)_mNHCO(CH_2)_{10}-CH(OH)-C_6H_{13}$$

wherein m denotes an integer of from 1 to 12

The above compounds can be used alone or in combination. The melting points of the above compounds are from 100° to 300° C., preferably from 130° to 250° C. In the case when the melting points are outside the above-mentioned range, the state of break-away of the interlayer cannot be brought to a desirable state at the time of heat transfer or the breakaway does not take place, and the object of this invention cannot be achieved.

The specific examples of the above high fatty acid metal salts, etc., suitable for use in the interlayer of this invention are as follows.

Lithium stearate (mp 220° C.), sodium stearate (mp 220° C.), calcium stearate (mp 179° C.), magnesium stearate (mp 132° C.), zinc stearate (mp 140° C.), sodium oleate (mp 235° C.), potassium oleate (mp 235°~240° C.), lithium myristate (mp 223° C.), aluminum palmitate (mp 200° C.), sodium palmitate (mp 270° C.), lithium palmitate (mp 224° C.), calcium 12-hydroxystearate (mp 148° C: industrial product grade), lithium 12-hydroxystearate (mp 216° C: industrial product grade), stearic acid bisamide (mp 136° C: industrial product grade), ethylene bisstearylamide (mp 140° C: industrial product grade), hydroxystearic acid bisamide (mp 134° C: industrial product grade).

The interlayer of this invention may be prepared not only from the above compounds, but also from a combination of the above compound(s) with wax or thermoplastic resin.

Wax contained in the interlayer of this invention in combination has a melting point of 50° to 100° C., preferably of 50° to 90° C. Wax works effectively to adjust the matting effect degree. In interlayers containing too large an amount of a high fattty acid metal salt, high fatty acid amide and their derivatives, a layer which has broken away conceals printed characters of a heat-melting ink and makes it difficult to read the printed characters. In such a case, it is made possible to effect easily readable matted-tone transfer by incorporating wax into the interlayer. Further, wax improves adhesion strength between a heat-melting ink layer and an interlayer, and is thus effective to facilitate the break-away in the interlayer at the time of heat transfer.

Examples of wax used in this invention include natural wax and synthetic wax. Examples of the natural wax include plant wax such as candelilla wax, carnauba wax, rice wax, haze wax, jojoba oil, etc., animal wax such as beeswax, lanolin, sperm oil, etc., mineral wax such as montan wax, ozokerite, ceresin wax, etc., petroleum wax such as paraffin wax, microcrystalline wax, petrolatum, etc. Examples of the synthetic wax include synthetic hydrocarbons such as FischerTropsch wax, polyethylene wax, etc., modified wax such as montan wax derivative, paraffin wax derivative, microcrystalline wax derivative, etc., hydrogenated wax such as hardened castor oil, hardened castor oil derivative, etc., fatty acids such as lauric acid, palmitic acid, myristic acid, stearic acid, 12-hydroxystearic acid, etc., and fatty acid amides.

The thermoplastic resin contained in the interlayer of this invention has a softening point of not higher than 200° C., preferably not higher than 180° C. In the case when the softening point is above the above limit value, the desirable break-away does not take place within an interlayer at the time of heat transfer. The thermoplastic resin is effective for adjustment of the viscosity of a coating liquid, and thus contributes toward formation of a coating having a uniform thickness at the time of solvent-coating in which the coating is carried out by dissolving said resin in a solvent. Further, the thermoplastic resin effectively contributes toward control of matting effect degree.

Examples of the thermoplastic resin used in this invention are as follows.

Polyvinyl chloride, polyvinyl acetate, vinyl chloride-vinyl acetate copolymer, polyethylene, polypropylene, polyacetal, ethylene-vinyl acetate copolymer, ethylene-ethyl acrylate copolymer, polystyrene, polyacrylic acid ester, polyamide, ethyl cellulose, epoxy resin, xylene resin, ketone resin, petroleum resin, rosin or its derivative, coumarone indene resin, terpine resin, polyurethane resin, synthetic rubber such as styrene-butadiene rubber, polyvinyl butyral, nitrile rubber, acryl rubber, ethylene-propylene rubber, etc.

When the interlayer of this invention is formed by formulation of high fatty acid metal salt(s), etc., and wax and/or thermoplastic resin, it is necessary to incorporate at least 4% by weight of the high fatty acid metal salt(s) etc. Preferably, the amount of incorporated high fatty acid metal salt(s) etc. is 4 to 99% by weight. In the case of below 4% by weight, the break-away does not take place within the interlayer, but separation takes place between the interlayer and the substrate or between the interlayer and the heat-melting ink layer. Thus, it is difficult to produce the break-away within the interlayer which is intended by this invention. The amount of wax to be incorporated is up to 96% by weight, preferably up to 95% by weight. In the case when the amount of the incorporated wax is larger than the above limit value, it is made difficult to produce the desired break-away within the interlayer. The amount of the thermoplastic resin to be incorporated is 30% by weight at most, preferably 1 to 30% by weight, more preferably 1 to 10% by weight. In the case when the amount of incorporated thermoplastic resin is larger than the above limit value, separation between the interlayer and the heat-melting ink layer proceeds, and it is made difficult to obtain a matted-tone printed article for which this invention is intended. Further, the interlayer of this invention may be colored with the same color as the heat-melting ink layer.

In order to provide the surface of a substrate with the interlayer of this invention, there is a hot-melt coating method, and more preferably there is a method of solvent-coating using a coating liquid obtained by dispersing the above compound in a solvent. In the method of solvent-coating, it is preferable to add a thermoplastic resin in order to adjust a coating liquid containing the above compound to a suitable viscosity, and a usually used dispersing agent may be used in order to obtain dispersion stability.

The suitable thickness of the coating is from 0.2 μm to 3 μm. In the case of being below 0.2 μm, the matting effect is reduced. And, in the case of being over 3 μm, the total thickness of transfer material is made larger, the handling of a roll of transfer material is not so easy because the diameter of a roll becomes large, and the energy sensitivity is reduced. Moreover, the matting effect is not improved.

Any of the conventionally known substrates for heat transfer may be used as the substrate of this invention. Examples of the substrates include a polyester film (polyethylene terephthalate, polyethylene naphthalate, etc.), polyamide film (nylon, etc.), polyolefin film (polypropylene, etc.), cellulose-type film (triacetate, etc.), polycarbonate film, condenser paper, glassine paper, etc. The polyester film, which is excellent in heat resistance, mechanical strength, tensile strength, tensile stability, etc., is most desirable. The thinner the substrate is, the better the heat conductivity is. However, the thickness of from 3 μm to 50 μm is most desirable to meet the requirements of strength and easy coating operation.

In the heat-melting ink layer, any ink heretofore known may be used without any modification. For example, there may be used an ink which comprises a binder selected from waxes such as paraffin wax, carnauba wax, haze wax, beeswax, etc., and a colorant selected from dyes, pigments, etc.

The heat-sensitive transfer material of this invention may be provided with a sticking prevention layer by applying a coating liquid, mainly, of a heat resistant resin onto the surface of a substrate on the opposite side to the heat-melting ink layer. That is because the sticking prevention layer is sometimes necessary in order to prevent the sticking which possibly takes place between the substrate and the thermal head depending upon printing conditions.

The heat-sensitive transfer material of this invention makes it possible to provide a matted-tone transfer article having reduced gloss on the printed surface, and therfore, is suitable to print charactered information requiring readability. Further, it produces an effect that a fine matted-tone transfer article can be obtained without causing decline in sensitivity and free from the control of concaves and convexes on the surface of a substrate or mat layer.

The following Examples will illustrate this invention more in detail. In the following; Examples, part means "part by weight".

EXAMPLE 1

A coating liquid of the following formulation was fully dispersed in an attritor at room temperature to prepare a coating liquid for an interlayer. The resulting coating liquid was coated on a 6 μm thick polyethylene terephthalate film by gravure coating method, and dried to form a 1 μm thick interlayer on the film.

Lithium stearate (mp 216° C. industrial product grade) 1 part
Carnauba wax 19 parts
Ethylene-vinylacetate copolymer ("Evaflex 420" produced by Mitsui Polychemical) 1 part
Toluene 79 parts Further, a coating liquid of the following formulation was fully kneaded by three-roll mill warmed at 90° to 120° C. to prepare a heat-melting ink. Then, the heat-melting ink was coated on the above interlayer to a coating thickness of 5 μm by roll coat method to obtain a heat-sensitive transfer material.

Carbon (Mitsubishi Carbon "MA-600") 10 parts
Ethylene-Vinyl acetate copolymer ("Evaflex 420" produced by Mitsui Polychemical) 5 parts
Carnauba wax 26 parts
Paraffin wax 59 parts The resulting heat-sensitive transfer material was used to effect the solid printing on a recording paper having a Beck smoothness degree of 150 seconds by the use of an ordinary thermal printer, and the matting effect on the surface of the transferred characters was measured at a measurement angle of 60 degrees by a gloss meter ("GM-3M" produced by Murakami Shikisai Kenkyujo) to show a gloss degree of 25. In general, the gloss degree of not more than 30 can be said to have a sufficient matting effect. Further, in the above printing on the recording paper, excellent printed characters were obtained, which were easily readable.

EXAMPLE 2

A heat-sensitive transfer material was prepared by the use of the following coating liquid for formation of an interlayer, the same heat-melting ink as in Example 1 and the same substrate as in Example 1 in the same way as in Example 1, and the matting effect on the resulting printed characters was measured to show a gloss degree of 18.

Formulation of the coating liquid for formation of an interlayer.

Calcium 12-hydroxystearate (mp 148° C.) 20 parts
Ethyl cellulose 1 part
Toluene 55 parts
Methylisobutyl ketone 24 parts

EXAMPLE 3

A heat-sensitive transfer material was prepared by the use of the following coating liquid for formation of an interlayer, the same heat-melting ink as in Example 1 and the same substrate as in Example 1 in the same way as in Example 1, and the matting effect on the resulting printed characters was measured to show a gloss degree of 13.

Formulation of the coating liquid for format;on of an interlayer.

Ethylene bisstearylamide (mp 140° C.) 20 parts
Styrene-butadiene-ethylene block. copolymer ("TR1184" produced by Shell Chemical) 1 part
Toluene 79 parts

EXAMPLE 4

A heat-sensitive transfer material was prepared by the use of the following coating liquid for formation of an interlayer, the same heat-melting ink as in Example 1 and the same substrate as in Example 1 in the same way as in Example 1, and the matting effect on the resulting printed characters was measured to show a gloss degree of 9.

Formulation of the coating liquid for formation of an interlayer.

NN'-hexamethylenebis-12-hydroxystearic acid amide (mp 134° C.) 20 parts
Polyvinyl butyral ("#3000-1" produced by Denki Kagaku Kogyo) 1 part
Isopropyl alcohol 79 parts

EXAMPLE 5

A heat-sensitive transfer material was prepared by the use of the following coating liquid for formation of an interlayer, the same heat-melting ink as in Example 1 and the same substrate as in Example 1 in the same way as in Example 1, and the matting effect on the resulting printed characters was measured to show a gloss degree of 15.

Formulation of the coating liquid for formation of an interlayer.

Lithium stearate 10 parts

Carnauba wax 26 parts

Paraffin wax 59 parts

Ethylene-vinyl acetate copolymer("Evaflex 420" produced by Mitsui Polychemical) 5 parts

COMPARATIVE EXAMPLE 1

The heat-melting ink of Example 1 was coated on a 6 μm thick polyethylene terephthalate tilm to a coating thickness of 5 μm by roll coat method. Evaluation was made in the same way as in Example 1 to show a glass degree of 40.

EXAMPLE 6

A heat-sensitive transfer material was prepared by the use of the following coating liquid for formation of an interlayer, the same heat-meltinq ink as in Example 1 and the same substrate as in Example 1 in the same way as in Example 1, and the matting effect on the resulting; printed characters was measured to show a gloss degree of 7.

Formulation of the coating liquid for formation of an interlayer.

Lithium stearate 20 parts

Ethylene-vinyl acetate copolymer("Evaflex 420" produced by Mitsui Polychemical) 1 part Toluene 79 parts

EXAMPLE 7

A heat-sensitive transfer material was prepared by the use of the following coating liquid for formation of an interlayer, the same heat-melting ink as in Example 1 and the same substrate as in Example 1 in the same way as in Example 1, and the matting effect on the resulting printed characters was measured to show a gloss degree of 7.

Formulation of the coating liquid for formation of an interlayer.

Lithium stearate 10 parts

Carnauba wax 10 parts

Ethylene-vinyl acetate copolymer("Evaflex 420" produced by Mitsui Polychemical) 1 part Toluene 79 parts

What we claim is:

1. In a heat-sensitive transfer material having a substrate and a heat-melting ink layer on one surface of said substrate, the improvement wherein there is provided, between said substrate and said heat-melting ink layer, an interlayer which breaks away within itself under heat at the time of heat transfer, said interlayer containing at least 4% by weight of a high fatty acid amide of the formula $$C_nH_{2n+1}NHCO(CH_2)_mCONHC_nH_{2n+1} \text{ or}$$

$$C_nH_{2n+1}CONH(CH_2)_mNHCOC_nH_{2n+1}$$

wherein n is an integer of from 12 to 32 and m is an integer of from 1 to 6.

2. A heat-sensitive transfer material according to claim 1 wherein said interlayer further contains at least one member selected from the group consisting of a wax and a thermoplastic resin.

3. A heat-sensitive transfer material according to claim 2 wherein the melting point of said wax is from 50° to 100° C.

4. A heat sensitive transfer material according to claim 2 wherein the softening point of said thermoplastic resin is not higher than 200° C.

5. A heat-sensitive transfer material according to claim 2 wherein the interlayer contains up to 96% by weight of a wax.

6. A heat-sensitive transfer material according to claim 2 wherein the interlayer contains 1 to 30% by weight of a thermoplastic resin.

7. A heat-sensitive transfer material according to claim 1 wherein the coating thickness of said interlayer is 0.2 to 3 μm.

8. A heat-sensitive transfer material according to claim 1 wherein said interlayer is free from colorant.

* * * * *